Figure 1:
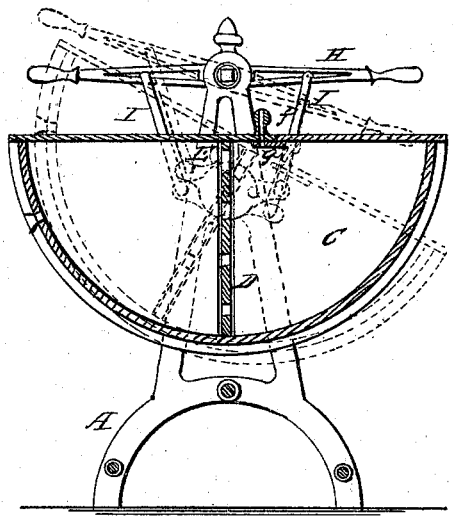
Figure 2:
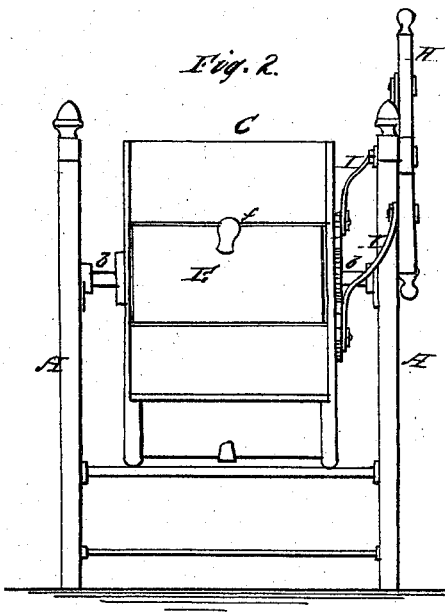

J. Glattner.
Churn.

No. 87,659.    Patented Mar. 9, 1869

Witnesses.
Victor H. Becker
Jno. J. Bonner.

Inventor.
John Glattner
by Forbush & Hyatt
Attys

United States Patent Office.

JOHN GLATTNER, OF SUSPENSION-BRIDGE, NEW YORK.

Letters Patent No. 87,659, dated March 9, 1869.

---

IMPROVEMENT IN CHURNS.

---

The Schedule referred to in these Letters Patent and making part of the same.

---

*To all whom it may concern:*

Be it known that I, JOHN GLATTNER, of Suspension-Bridge, in the county of Niagara, and State of New York, have invented a certain new and useful Improvement in Churns; and I do hereby declare that the following is a full and exact description thereof, reference being had to the accompanying drawings, making part of this specification.

The invention consists of the combination and arrangement of a rock-lever and connecting-bar with a churn, supported on pivots, so as to be oscillated by said lever, as hereinafter set forth.

In the above drawings—

Figure I is a longitudinal vertical section of a churn supported and operated by my improved arrangement.

Figure II is an end elevation of the same.

Like letters refer to like parts in both of the figures.

A A represent two standards of any suitable frame, between which is supported, on suitable pivots, $b\ b$, the churn C.

This vessel is preferably made of semi-cylindrical form, as shown, with a radially-arranged and removable perforated partition, D.

It is closed at the top, with a portion, E, made removable, for access to the interior.

This lid is provided with a knob, $f$, and catch, $g$, for securing it in place, the knob being centrally perforated, so as to form a suitable vent-hole, for the entrance and escape of air.

H is a rock-lever, pivoted to the top of one of the standards A, with a bar, I, on one or both sides of the pivot, connecting this lever with the side of the churn, so near its pivot that the leverage on the churn will be less than the short arm of the lever.

Fig. I, in black lines, shows the churn and lever in their normal position, when the machine is at rest.

By working the lever, the churn is oscillated, as represented in Fig. II, and by the red lines in Fig. I, its oscillation being greater than that of the lever, for the reason above stated.

The churn being pivoted near its centre of gravity, so as to be nearly counterbalanced, its oscillation is effected with the exertion of comparatively little force.

This movement causes the milk to rush rapidly back and forth through the perforated partition, and against the sides of the vessel, which breaks the cream-globules, and speedily effects their conversion into butter.

What I claim as my invention, and desire to secure by Letters Patent, is—

The combination and arrangement of the rock-lever H, connecting-bar I, standards A, and pivoted churn C, operating substantially as set forth.

JOHN GLATTNER.

Witnesses:
    LUDWIG ZIMMERMANN,
    JOHN BEUNK.